(12) United States Patent
Levey et al.

(10) Patent No.: US 9,080,593 B2
(45) Date of Patent: Jul. 14, 2015

(54) EMBEDDABLE ASSEMBLY

(75) Inventors: Kenneth R Levey, West Chicago, IL (US); Jason D Holt, St. Charles, IL (US); Robert R Schaser, Hampshire, IL (US)

(73) Assignee: Illinois Tool Works Inc., Glenview, IA (US)

( * ) Notice: Subject to any disclaimer, the term of this patent is extended or adjusted under 35 U.S.C. 154(b) by 247 days.

(21) Appl. No.: 13/582,538

(22) PCT Filed: Apr. 6, 2011

(86) PCT No.: PCT/US2011/031338
§ 371 (c)(1),
(2), (4) Date: Sep. 4, 2012

(87) PCT Pub. No.: WO2011/130070
PCT Pub. Date: Oct. 20, 2011

(65) Prior Publication Data
US 2012/0328391 A1    Dec. 27, 2012

Related U.S. Application Data

(60) Provisional application No. 61/324,855, filed on Apr. 16, 2010.

(51) Int. Cl.
*F16B 37/06* (2006.01)
*F16B 37/12* (2006.01)
*F16B 39/30* (2006.01)
*B29C 65/44* (2006.01)
*B29C 65/64* (2006.01)
*B29C 65/00* (2006.01)

(52) U.S. Cl.
CPC ............ *F16B 37/125* (2013.01); *F16B 37/068* (2013.01); *F16B 39/30* (2013.01); *B29C 65/44* (2013.01); *B29C 65/645* (2013.01); *B29C 66/30321* (2013.01); *B29C 66/474* (2013.01); *B29C 66/742* (2013.01)

(58) Field of Classification Search
CPC .......... F16B 33/02; F16B 37/12; F16B 39/30; F16B 17/00; F16B 37/125; B29C 65/44; B29C 65/64; B29C 65/645; B29C 66/30321; B29C 66/474; B29C 66/742
USPC .................................. 411/337, 311, 82, 180
See application file for complete search history.

(56) References Cited

U.S. PATENT DOCUMENTS 1,107,544 A * 8/1914 Ogden .......................... 411/183
4,278,005 A * 7/1981 Lachner et al. ............... 411/337
(Continued)

FOREIGN PATENT DOCUMENTS

EP    0527627 A1    2/1993
GB    1457517 A    12/1976

OTHER PUBLICATIONS

An International Search Report, dated Jul. 6, 2011 in International Application No. PCT/US2011/031338.

*Primary Examiner* — Gay Spahn

(57) ABSTRACT

An external surface for a fastener insert to be embedded in a component includes a plurality of spaced rings surrounding a embeddable shank of the insert. The rings define a plurality of waves. The ring height can be increased progressively from a distal end of the insert to the rings nearest the head of the insert, thereby providing a generally tapered outer configuration for the insert.

17 Claims, 2 Drawing Sheets

(56) References Cited

U.S. PATENT DOCUMENTS

| | | |
|---|---|---|
| 4,764,067 A | 8/1988 | Kawashima |
| 4,782,681 A | 11/1988 | Kawashima |
| 4,782,688 A | 11/1988 | Kawashima |
| 4,840,524 A * | 6/1989 | Bisping et al. .................. 411/82 |
| 5,082,405 A * | 1/1992 | Witten ............................ 411/82 |
| 5,391,031 A | 2/1995 | Medal |
| 6,976,818 B2 | 12/2005 | Levey et al. |
| 7,326,014 B2 | 2/2008 | Levey et al. |
| 7,819,614 B2 | 10/2010 | Versino et al. |
| 8,651,787 B2 | 2/2014 | Levey et al. |
| 2002/0014339 A1 * | 2/2002 | Ross ............................. 166/380 |
| 2002/0131843 A1 | 9/2002 | Chen-Chi et al. |
| 2005/0238459 A1 * | 10/2005 | Levey et al. ................... 411/308 |
| 2008/0119778 A1 * | 5/2008 | Jorgensen et al. .............. 604/14 |
| 2008/0232925 A1 * | 9/2008 | Chang ......................... 411/387.4 |
| 2009/0092461 A1 | 4/2009 | Bubulka et al. |
| 2010/0014938 A1 * | 1/2010 | Sussenbach .................. 411/309 |
| 2011/0070047 A1 * | 3/2011 | Martin .......................... 411/178 |
| 2012/0315110 A1 | 12/2012 | Levey et al. |

* cited by examiner

EMBEDDABLE ASSEMBLY

CROSS-REFERENCE TO RELATED APPLICATIONS

The present application is based on International Application No. PCT/US2011/031338, filed Apr. 6, 2011 and claims the benefits of U.S. Provisional Application Ser. No. 61/324,855 filed Apr. 16, 2010.

FIELD OF THE INVENTION

The present invention relates generally to fasteners and fastener systems, and, more particularly, to fastener components of fastener systems that are embedded in another part, often of dissimilar material.

BACKGROUND OF THE INVENTION

It is known to provide fastening systems that include threaded inserts to be embedded in plastic or other components to receive a screw or bolt for holding a second component in an assembly. For example, plastic parts in automobiles, computers, appliances of different types, and various other assemblies are known to be provided with metal inserts having internal threads so that another part can be held thereto by a bolt or screw engaged with the threaded insert. It is also known to anchor a threaded stud in a plastic or other part so that another component can be held thereon by a nut engaged with the threads of the stud.

Various techniques are known for securing the anchored component, such as a threaded insert or stud, in the plastic or other part. Simple threaded engagement can be used, with threads on the outer surface of the insert or stud threaded into the component in which it is held. In a process known as heat-staking, a metal part, such as a threaded female insert or stud, is heated and pushed into the plastic component in which it is held, melting and fusing the interfacing plastic surface thereto. Heat-staking and can be performed relatively inexpensively. Ultrasonic insertion is also known whereby the part is vibrated ultrasonically and pushed into the receiving component. Ultrasonic insertion can be performed relatively quickly, but the process tends to be expensive. In a more simple mechanical process, the component to be anchored is provided with a knurled or other configured outer surface and is simply pushed into the receiving component. Mechanical insertion such as this can be performed quickly, but the machining process required to form the outer surface of the insert adds significantly to overall cost. Further, mechanical insertions tend to channel or direct the material of the anchor component, and it has been difficult to achieve significant holding strength against pullout with push-in inserts. Further, to facilitate easy and rapid machining of inserts, it has been known to use expensive materials, such as brass. Knurls, undercuts and other such formations can be formed readily in brass; however, the costs of parts made of such materials are high.

Advantages can be obtained from providing an insert having a surface configuration that can be manufactured quickly and easily with efficient processes using inexpensive materials and that can be inserted into plastic or other components in a rapid, cost efficient process while providing significant resistance to both pullout and rotation in the completed assembly.

SUMMARY OF THE INVENTION

The embeddable insert disclosed herein provides circumferential rings on an embeddable shank of an insert, each ring being continuous around the shank and spaced from adjacent rings. Each ring defines a series of waves generally axially oriented on the shank to provide both more axially oriented portions and more circumferentially oriented portions.

In one aspect of a form thereof, a fastener insert is provided with an embeddable shank having an external surface and a plurality of discrete, spaced rings projecting from the external surface and extending around the shank. Each ring defines a plurality of continuous waves each including a first portion and a second portion, the first portion being more prominently axially oriented than the second portion, and the second portion being more prominently circumferentially oriented than the first portion.

In another aspect of a form thereof, a fastener insert is provided with an embeddable shank having an external surface and a plurality of discrete, generally parallel, spaced circumferential rings projecting from the external surface. Each ring defines a plurality of continuous waves having wave heights generally axially oriented on the shank.

In a further aspect of a form thereof, an external surface on a fastener insert including a shank is provided with a plurality of spaced rings projecting from and extending circumferentially around the shank. Each ring defines a series of waves, each wave including a first portion and a second portion, the first portion being more prominently axially oriented than the second portion, and the second portion being more prominently circumferentially oriented than the first portion relative to axial and circumferential directions on the shank.

Other features and advantages of the invention will become apparent to those skilled in the art upon review of the following detailed description, claims and drawings in which like numerals are used to designate like features.

Figure 1:
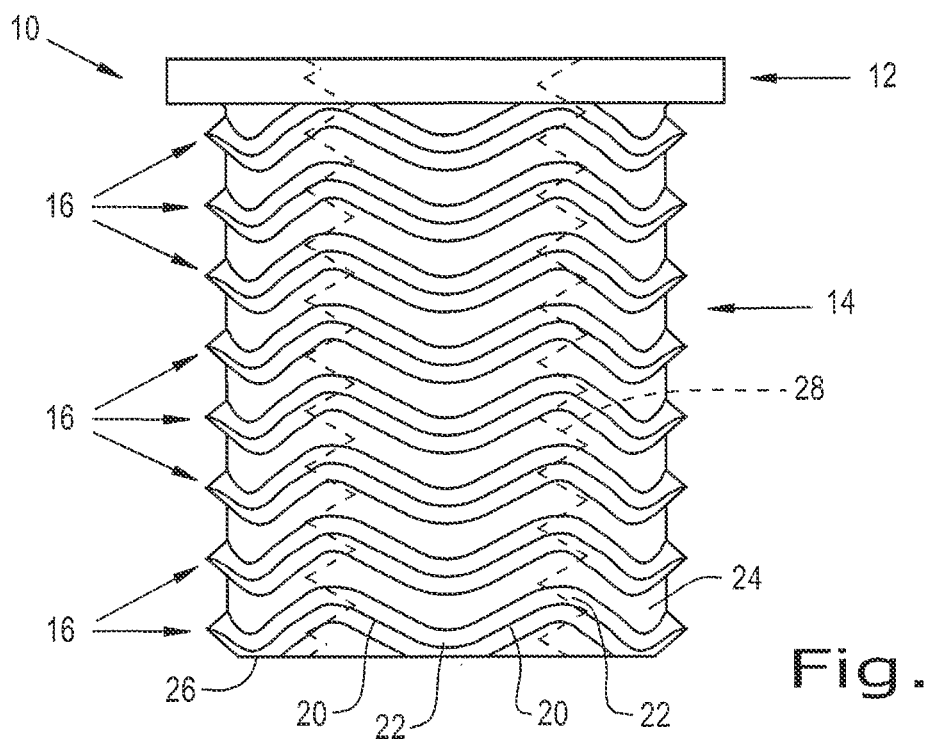
FIG. 1 is a perspective view of an embeddable insert.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

With reference now more particularly to the drawings and to FIG. 1 in particular, an embeddable insert 10 is shown. Insert 10 is a monolithic body and includes a head 12 and an embeddable shank 14. A plurality of individual rings 16 are provided on shank 14. Each ring 16 is a protrusion or ridge projecting from the outer surface of shank 14. Each ring 16 extends continuously around shank 14 in spaced relation to rings 16 on either side thereof. Each ring 16 includes pluralities of portions differently angled with respect to the axial and circumferential directions of shank 14. Accordingly, each ring 16 includes substantially more axially oriented portions 20 and substantially more circumferentially oriented portions 22, with continuous transitions interconnecting sequential portions of a ring 16 that are more axially oriented and more circumferentially oriented portions. Individual rings 16 are spaced from each other to define inter-ring channels 24. In the exemplary embodiment, a sufficient quantity of spaced rings 16 is provided to substantially fill the axial length of shank 14 from near a distal end 26 thereof to near head 12. However, it should be understood that fewer rings 16 also can be used, to cover only a portion of the length of shank 14. In the exemplary embodiment, insert 10 is a female insert having an axial opening there through defining female threads 28 illustrated by dashed lines in FIG. 1.

In the exemplary embodiment of FIG. 1, each ring 16 of insert 10 extends circumferentially around shank 14 in a continuous pattern of waves defined by the successive more axially oriented portions 20 and more circumferentially oriented portions 22, and the continuous transitions therebetween. The waves defined by the rings 16 are generally axially oriented on shank 14, with wave crests thereof axially aligned. Accordingly, rings 16 extended generally parallel to one another, in spaced relation.

Insert 10 can be manufactured efficiently from inexpensive metal, such as steel, altered in a rolling process utilizing dies to form the desired surface characteristics. Accordingly, insert 10 can be manufactured efficiently and inexpensively. Of course, more expensive materials can be used for installations requiring specific metal characteristics. Still other materials can be used and manufacturing processes other than a rolling process can also be used if desired. The rings 16 provide both significantly more axially oriented portions and significantly more circumferentially oriented portions in a continuous form, to resist both rotation and pull-out of the insert from the material in which it is embedded.

Adjacent rings 16 can be spaced more distantly or more closely, to define relatively wide or relatively narrow inter-ring channels 24. It should be understood that the relative prominence of the more axially oriented portions and the more circumferentially oriented portions can be altered to achieve desired characteristics relative to the resistance to rotation and pullout in the assembly. Further, rings 16 can be provided more closely or more distantly spaced, and the ring height can be varied to achieve desired characteristics. Further, whereas the exemplary embodiment shows rings 16 to be consistently spaced, spacing between rings 16 can be different along different portions of shank 14.

Insert 10 described herein can be installed particularly well by ultrasonic insertion, but may be installed by other methods as well. The most advantageous processes for installing the insert will cause material of the body in which the insert is installed to flow into the inter-ring channels 24, to lock the insert in position. Accordingly, insertion techniques other than ultrasonic insertion also can be used. Further, direct placement in molded components during the molding process, or subsequent fill of molten material in a pocket including the insert can also suitably anchor inserts as described herein. With good fill in the inter-ring channels 24, resistance against rotation and pullout is provided by the more axially oriented and more circumferentially oriented portions engaging the confronting rivers of plastic filling the inter-ring channels 24. The generally more axially oriented portions resist rotation of the insert in the receiving component, and the generally more circumferentially oriented portions resist pullout of the insert from the receiving component. The length, height and frequency of the generally more axially oriented portions and the generally more circumferentially oriented portions can be adjusted to achieve the desired pullout and rotational resistance of a particular insert in a specific material.

Figure 2:
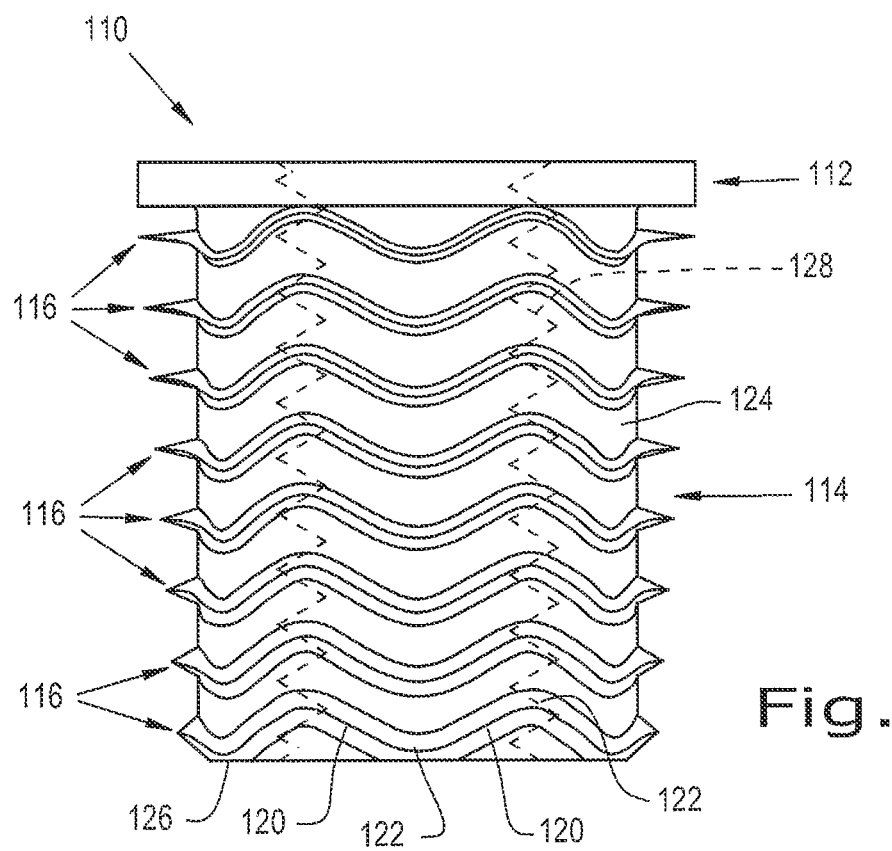
FIG. 2 is an elevational view of another insert.
Figure 3:
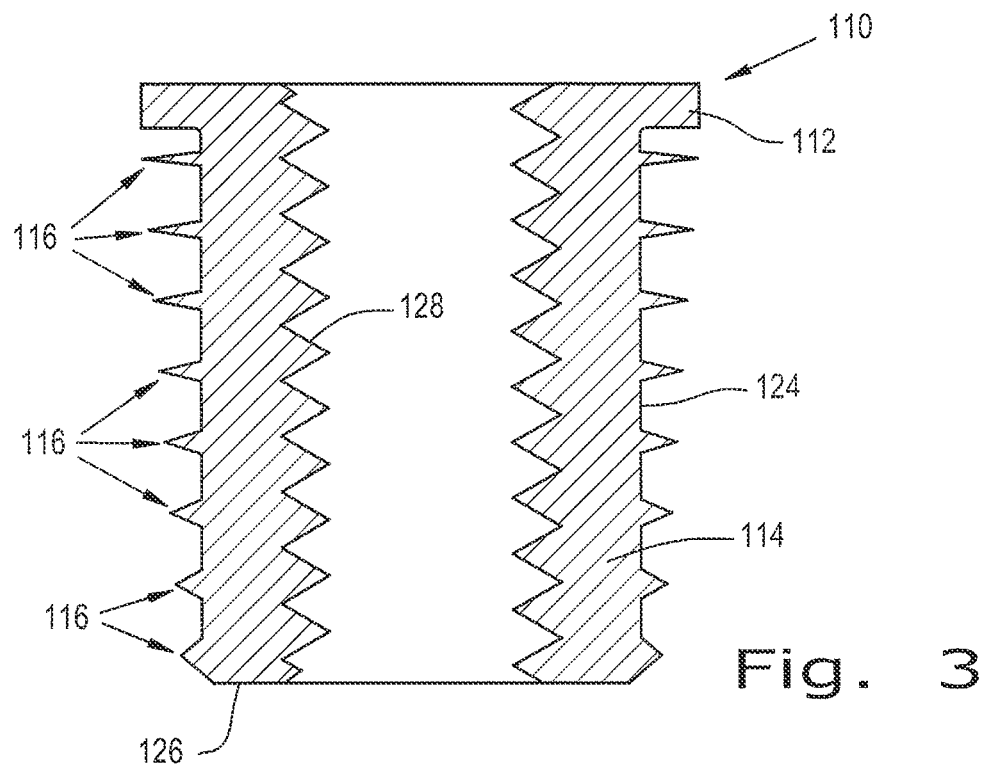
FIG. 3 is a is a cross-sectional view of the insert shown in FIG. 2.

FIGS. 2 & 3 show another embodiment of a ringed insert 110, which is a monolithic body of metal such as steel, including a head 112 and an embeddable shank 114. A plurality of individual rings 116 are provided on shank 114. Each ring 116 is a protrusion or ridge projecting from the outer surface of shank 114. Each ring 116 extends continuously around shank 114 in spaced relation to rings 116 on either side thereof. Each ring 116 includes pluralities of portions differently angled with respect to the axial and circumferential directions of shank 114. Accordingly, each ring 116 includes substantially more axially oriented portions 120 and substantially more circumferentially oriented portions 122, with continuous transitions interconnecting sequential portions of a ring 116 that are more axially oriented and more circumferentially oriented portions. Individual rings 116 are spaced from each other to define inter-ring channels 124. In this exemplary embodiment, insert 110 is a female insert having an axial opening there through defining female threads 128

In the exemplary embodiment of FIGS. 2 & 3, each ring 116 of insert 110 extends circumferentially around shank 114 in a continuous pattern of waves defined by the successive more axially oriented portions 120 and more circumferentially oriented portions 122, and the continuous transitions therebetween.

A natural taper can be built into the exterior limits of insert 110 to facilitate ultrasonic insertion, which is performed best by using a tapered part. Using straight dies, ring heights of each ring 116 can be progressively varied such that rings 116 near head 112 are taller and thinner, having a greater ring height and narrower width than the rings 116 near a distal end 126 of shank 114 that are shorter and thicker, with a shorter ring height. Those skilled in the art will understand that progressively varying rings as described can be rolled from a blank for the insert such that the volume of material in each ring is the same even with the varying ring widths and ring heights from one end of insert 110 to the other end of insert 110. Accordingly an overall tapered effect is provided even when using a straight shank. The insert can be tapered without requiring tapered blanks or tapered dies.

Figure 4:
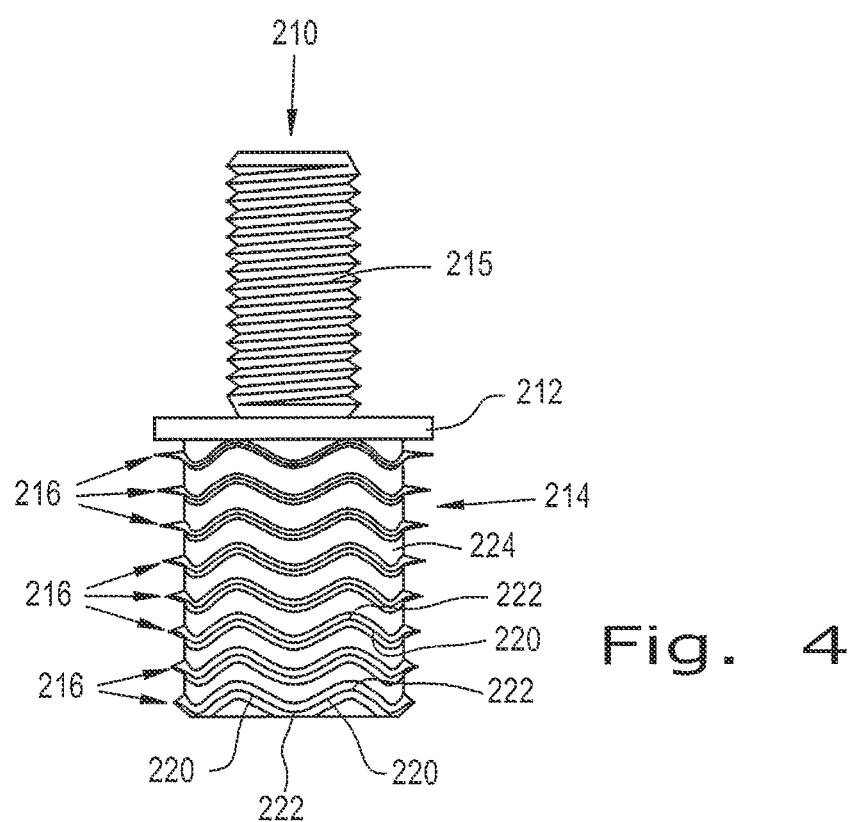
FIG. 4 is an elevational view of still another insert.

FIG. 4 shows another embodiment of a ringed insert 210, which is a monolithic body of metal such as steel, including a head 212, an insertable shank 214 and a threaded stud 215 axially extending from the opposite side of head 214 from insertable shank 214. A plurality of individual rings 216 are provided on shank 214, each being a protrusion or ridge projecting from the outer surface of shank 214. Each ring 216 extends continuously around shank 214 in spaced relation to rings 216 on either side thereof and includes pluralities of portions differently angled with respect to the axial and circumferential directions of shank 214. Accordingly, each ring 216 includes substantially more axially oriented portions 220 and substantially more circumferentially oriented portions 222, with continuous transitions interconnecting sequential portions that are more axially oriented and more circumferentially oriented portions. Individual rings 216 are spaced from each other to define inter-ring channels 224.

In the exemplary embodiment of FIG. 4, each ring 216 of insert 210 extends circumferentially around shank 214 in a continuous pattern of waves defined by the successive more axially oriented portions 220 and more circumferentially oriented portions 222, and the continuous transitions therebetween. Shank 214 defines a natural taper at the exterior limits thereof, as described previously for shank 214. Each ring 216 is progressively varied in height relative to the adjacent rings 216 such that rings 216 near head 212 are taller and thinner, having a greater ring height than the rings 216 near distal end 226 that are shorter and thicker, with a shorter ring height. Accordingly an overall tapered effect is provided.

The ring forms on embedded inserts as described herein can provide both rotation and pullout resistance without complex undercuts or knurled formations, as used previously. As a result, the insert can provide the anti-rotation and pullout resistance performance of expensive, machined inserts, typically of brass, but with the cost advantages of low cost, cold rolled steel.

Inserts having shank surfaces with rings as described herein work well when installed by a process that provides plastic material flow into the inter-ring channels between the rings, where the plastic will freeze after the insert is installed. The ring will then push against the plastic to resist both pullout and rotation. The shanks with rings as described herein can work well for many types of inserted fastener components, not only female inserts for use as screw and bolt anchors and male threaded stud inserts as described herein for threaded engagement with a nut or other threaded component. It should be understood that the inserts with rings as described herein can be used also on the embedded portions of many anchored male and female components, such as, for example, male or stud components of other types such as ring studs, ball-ended studs designed to snap-fit into other components, or an anchored stud having any other type of end configuration suitable for a purpose. For example, the stud could define a hook, a nail point, an electrical contact or other configuration, whether complex or simple. Other embedded female components and neutral anchored devices also can use rings as described herein. Further, while shown for straight shanks, the insert surfaced disclosed herein can be used for other than straight shanks as well as stepped shanks.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener insert, comprising:
   a monolithic body having:
   a head and a distal end;
   an embeddable shank having an external surface and an axial opening from said head through said distal end, said shank configured to be inserted, embedded, and locked into a mating component;
   a plurality of discrete, non-threaded, non-expanding spaced apart rings projecting from said external surface and extending around said shank; and
   each said ring defining a plurality of continuous waves each including a first portion and a second portion, said first portion being more prominently axially oriented than said second portion and said second portion being more prominently circumferentially oriented than said first portion, wherein said rings embed and lock said shank into the mating component.

2. The fastener insert of claim 1, including a stud extending opposite said shank.

3. The fastener insert of claim 1, said rings defining inter-ring channels therebetween.

4. The fastener insert of claim 1, said rings being consistently shaped from one end of said shank to an opposite end of said shank.

5. The fastener insert of claim 1, said shank having a head end thereof and a distal end, and said rings having progressively greater ring heights from said distal end to said head end.

6. The fastener insert of claim 5, said rings defining consistent volumes from said distal end to said head end.

7. The fastener insert of claim 1, a first ring nearest one end of said shank being thicker and having a shorter ring height than a width and ring height of a second ring nearest an opposite end of said shank, and rings between said first and second rings progressively decreasing in width and increasing in ring height.

8. The fastener insert of claim 7, including a stud extending opposite said shank.

9. A fastener insert, comprising:
   a head and a distal end;
   an embeddable shank having an internally threaded portion and an external, non-tapering surface from said head to said distal end, said shank configured to be inserted, embedded, and locked into a mating component;
   a plurality of discrete, generally parallel, non-threaded, non-expanding spaced apart circumferential rings projecting from said external surface; and
   each said ring defining a plurality of continuous waves having wave heights generally axially oriented on said shank, wherein said rings embed and lock said shank into the mating component.

10. The fastener insert of claim 9, said shank having an opening therethrough.

11. The fastener insert of claim 9, including a stud extending away from said shank axially.

12. The fastener insert of claim 9, including a first ring nearest one end of said shank being thicker and having a shorter ring height than a width and ring height of a second ring nearest an opposite end of said shank, and rings between said first and second rings progressively decreasing in width and increasing in ring height.

13. The fastener insert of claim 9, said rings progressively varying in ring height from one end of said shank to an opposite end of said shank.

14. The fastener insert of claim 9, defining an external surface which includes said shank and said rings, wherein the shank further has a head end and a distal end opposite the head end, and wherein each wave includes a first portion and a second portion, said first portion being more prominently axially oriented than said second portion and said second portion being more prominently circumferentially oriented than said first portion relative to axial and circumferential directions on the shank.

15. The fastener insert of claim 14, said spaced rings progressively varying in ring height from said distal end to said head end.

16. The fastener insert of claim 15, said spaced rings defining consistent volumes from said distal end to said head end.

17. The fastener insert of claim 14, a first ring nearest said distal end being thicker and having a shorter ring height than a width and ring height of a second ring nearest said head end, and said spaced rings between said first and second rings progressively decreasing in ring width and increasing in ring height.

* * * * *